United States Patent
Lim et al.

(10) Patent No.: US 11,108,514 B2
(45) Date of Patent: Aug. 31, 2021

(54) METHOD AND APPARATUS FOR DETERMINING A CODEBOOK IN NON-ORTHOGONAL MULTIPLE ACCESS SYSTEM

(71) Applicants: Samsung Electronics Co., Ltd, Suwon-si (KR); Postech Academy-Industry Foundation, Pohang-si (KR)

(72) Inventors: Jongbu Lim, Suwon-si (KR); Namyoon Lee, Pohang-si (KR); Jiwook Choi, Pohang-si (KR)

(73) Assignees: Samsung Electronics Co., Ltd., Suwon-si (KR); Postech Academy-Industry Foundation, Pohang-si (KR)

(*) Notice: Subject to any disclaimer, the term of this patent is extended or adjusted under 35 U.S.C. 154(b) by 34 days.

(21) Appl. No.: 16/438,238

(22) Filed: Jun. 11, 2019

(65) Prior Publication Data
US 2019/0379498 A1 Dec. 12, 2019

(30) Foreign Application Priority Data
Jun. 11, 2018 (KR) .................. 10-2018-0067085

(51) Int. Cl.
*H04L 5/00* (2006.01)
*H04L 27/26* (2006.01)
*H04B 7/06* (2006.01)

(52) U.S. Cl.
CPC .......... *H04L 5/0037* (2013.01); *H04B 7/063* (2013.01); *H04L 27/2646* (2013.01)

(58) Field of Classification Search
None
See application file for complete search history.

(56) References Cited

U.S. PATENT DOCUMENTS

| 9,240,853 B2 | 1/2016 | Nikopour et al. |
| 2013/0028343 A1* | 1/2013 | Jongren ............ H04L 25/03343 375/267 |

(Continued)

OTHER PUBLICATIONS

Yuya Saito et al., "Non-Orthogonal Multiple Access (NOMA) for Cellular Future Radio Access", 2013 IEEE 77th Vehicular Technology Conference (VTC Spring), Jun. 2-5, 2013, 5 pages.

(Continued)

*Primary Examiner* — Gregory B Sefcheck
*Assistant Examiner* — Amarnauth G Persaud

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology. The disclosure provides a codebook determination method of a terminal. The codebook determination method includes modulating input bits to generate a symbol vector using index information, determining a codebook based on information on subcarriers and information on modulation, determining a unitary matrix to be assigned to the terminal based on a codeword of the determined codebook, precoding the symbol vector based on the codebook and the unitary matrix, and transmitting the symbol vector to a base station on the subcarriers.

13 Claims, 7 Drawing Sheets

(56) References Cited

U.S. PATENT DOCUMENTS

| | | | |
|---|---|---|---|
| 2017/0127423 A1* | 5/2017 | Boroujeni | H04L 1/00 |
| 2017/0180032 A1* | 6/2017 | Basar | H04B 7/0452 |
| 2019/0173556 A1* | 6/2019 | Zhou | H04L 1/06 |
| 2019/0260417 A1* | 8/2019 | Park | H04B 7/0854 |
| 2020/0163058 A1* | 5/2020 | Lee | H04L 5/0014 |
| 2020/0244324 A1* | 7/2020 | Kotecha | H04B 7/043 |

OTHER PUBLICATIONS

Jaap van de Beek et al., "Multiple Access with Low-Density Signatures", GLOBECOM 2009—2009 IEEE Global Telecommunications Conference, Nov. 30-Dec. 4, 2009, 6 pages.

Hosein Nikopour et al., "Sparse Code Multiple Access", 2013 IEEE 24th Annual International Symposium on Personal, Indoor, and Mobile Radio Communications (PIMRC), Sep. 8-11, 2013, p. 332-336.

Shanzhi Chen et al., "Pattern Division Multiple Access—A Novel Nonorthogonal Multiple Access for Fifth-Generation Radio Networks", IEEE Transactions on Vehicular Technology, vol. 66, No. 4, Apr. 2017, p. 3185-3196.

Mahmoud Taherzadeh et al., "SCMA Codebook Design", 2014 IEEE 80th Vehicular Technology Conference (VTC2014—Fall), Sep. 14-17, 2014, 5 pages.

Ertugrul Basar et al., "Orthogonal Frequency Division Multiplexing with Index Modulation", IEEE Transactions on Signal Processing, vol. 61, No. 22, Nov. 15, 2013, p. 5536-5549.

P. Dita, "Factorization of Unitary Matrices", Mar. 6, 2001, 12 pages.

\* cited by examiner

METHOD AND APPARATUS FOR DETERMINING A CODEBOOK IN NON-ORTHOGONAL MULTIPLE ACCESS SYSTEM

CROSS-REFERENCE TO RELATED APPLICATIONS

This application is based on and claims priority under 35 U.S.C. 119 to Korean Patent Application No. 10-2018-0067085, filed on Jun. 11, 2018, in the Korean Intellectual Property Office, the disclosure of which is herein incorporated by reference in its entirety.

BACKGROUND

1. Field

The disclosure relates to a wireless communication system and, in particular, to an apparatus and method for an index modulation-based (IM-based) non-orthogonal multiple access (NOMA) system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Third generation (3G) systems are based on a code division multiple access (CDMA) scheme, and 4G systems are based on an orthogonal multiple access (OMA) scheme such as orthogonal frequency division multiple access (OFDMA). OFDMA makes it possible to use multiple carriers; OFDMA is a technique using multiple carriers for communication and OFDMA subcarrier orthogonality makes it possible to support a plurality of user equipments (UEs). However, there is still an increasing demand for data rate improvement to meet exponentially increasing user data requirements in the 5G communication system.

In this regard, the disclosure proposes a NOMA-based wireless system that is capable of generating transmit symbols through IM and allowing multiple users to use the same subcarriers simultaneously.

SUMMARY

As described above, a communication system according to an embodiment of the disclosure is advantageous in terms of improving frequency efficiency by using an IM-based NOMA system.

Apparatuses and methods according to embodiments of the disclosure are advantageous in terms of determining a code book per UE using a unitary matrix generated so as to minimize an error rate of a transmit symbol vector.

According to an embodiment of the disclosure, a codebook determination method of a terminal in a wireless communication system includes modulating input bits to generate a symbol vector using index information, determining a codebook based on information on subcarriers and information on modulation, determining a unitary matrix to be assigned to the terminal based on a codeword of the determined codebook, precoding the symbol vector based on the codebook and the unitary matrix, and transmitting the symbol vector to a base station on the subcarriers.

Preferably, the unitary matrix is determined to maximize a diversity order and shaping gain of the codebook.

Preferably, determining the codebook includes determining the codebook based on a number of activated subcarriers, a number of terminals sharing the subcarriers, and a modulation scheme.

Preferably, the input bits include first bits conveying information on indices and second bits conveying information on symbols.

Preferably, the first bits are determined based on a number of activated subcarriers.

Preferably, modulating the input bits includes determining activated subcarriers among subcarriers available for use by the terminal based on the first bits and modulating the second bits to generate the symbol vector based on the activated subcarriers.

Preferably, the method further includes performing orthogonal frequency division multiplexing (OFDM) modulation on the precoded symbol vector after precoding.

Preferably, the wireless communication system is a non-orthogonal multiple access (NOMA) wireless system.

According to an embodiment of the disclosure, a terminal in a wireless communication system includes a transceiver and a controller configured to control to modulate input bits to generate a symbol vector using index information, determine a codebook based on information on subcarriers and information on modulation, determine a unitary matrix to be assigned to the terminal based on a codeword of the determined codebook, precode the symbol vector based on the codebook and the unitary matrix, and transmit the symbol vector to a base station on the subcarriers.

According to an embodiment of the disclosure, a terminal in a wireless communication system includes a channel encoder configured to encode input bits, an index modulator configured to receive the encoded bits from the channel encoder and modulate the encoded bits to generate a symbol vector based on index information conveyed in the encoded bits, a processor configured to control to precode the symbol vector, and an orthogonal frequency division multiplexing (OFDM) modulator configured to perform OFDM modulation on the precoded symbol vector to transmit the precoded symbol vector on subcarriers.

Preferably, the processor is configured to control to determine a codebook based on a number of activated subcarriers, a number of terminals sharing the subcarriers, and a modulation scheme, determine a unitary matrix to be assigned to the terminal based on a codeword of the determined codebook, and precode the symbol vector based on the codebook and the unitary matrix.

Preferably, the unitary matrix is determined to maximize a diversity order and shaping gain of the codebook.

Preferably, the wireless communication system is a non-orthogonal multiple access (NOMA) wireless system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
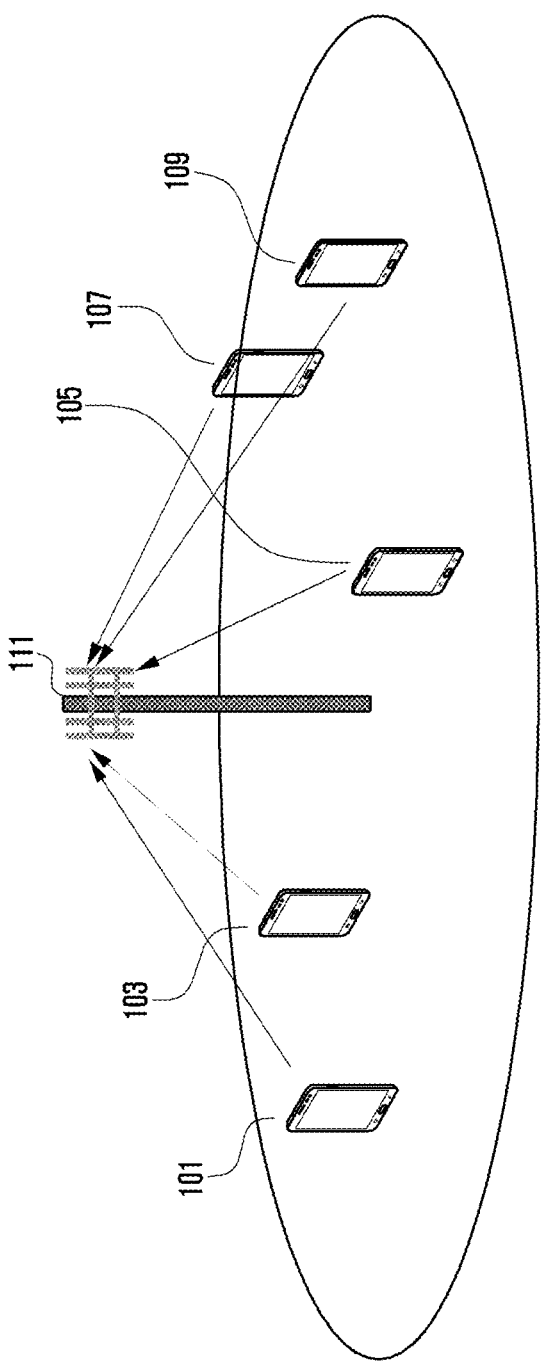
FIG. 1 illustrates a diagram of a multiple access situation in a wireless communication system.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. In an embodiment, a module may include one or more processors.

FIG. 1 illustrates a diagram of a multiple access situation in a wireless communication system.

According to an embodiment, a base station 111 may communicate signals with multiple UEs 101, 103, 105, 107, and 109. According to an embodiment, the wireless communication may employ a NOMA scheme.

According to an embodiment, the NOMA scheme may support more UEs than a legacy orthogonal multiple access scheme on the same time-frequency resources. According to an embodiment, the NOMA scheme is capable of improving a communication throughput of the wireless communication system and saving radio resources of the wireless communication system.

Figure 2:
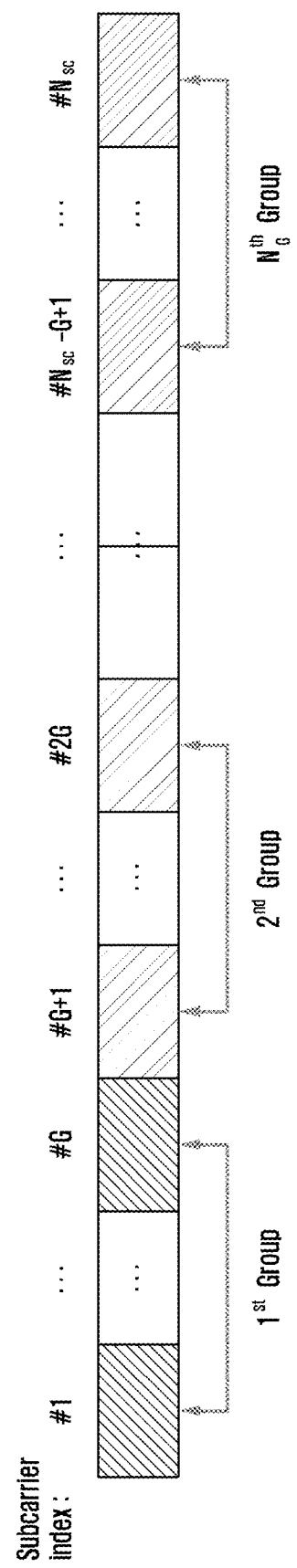
FIG. 2 illustrates a diagram of subcarriers grouped for use in an IM scheme according to an embodiment of the disclosure.

FIG. 2 illustrates a diagram of subcarriers grouped for use in an IM scheme according to an embodiment of the disclosure.

According to an embodiment, for communication between a UE and a base station, the UE may transmit information on the subcarriers for use in communication with the base station to the base station. According to an embodiment, a communication scheme using the above technique may be referred to as an orthogonal frequency division multiplexing with index modulation (OFDM-IM) scheme.

According to an embodiment, the OFDM-IM scheme may achieve a higher frequency efficiency and a lower error rate in comparison with an OFDM scheme under the condition of using the same modulation coefficient M. That is, the OFDM-IM scheme is capable of achieving the same frequency efficiency as the OFDM scheme with a lower modulation coefficient M, which means a higher energy efficiency.

A description is made with reference to FIG. 2 using parameters as follows.

$N_{SC}$: Number of subcarriers per OFDM block

G: Number of subcarriers per subcarrier group $N_G$: Number of subcarrier groups ($=N_{SC}/G$)

K: Number of activated subcarriers per sub carrier group

According to an embodiment, a total number of OFDM subcarriers $N_{SC}$ may be divided into $N_G$ groups based on the number of subcarriers G per subcarrier groups. That is, $p*N_G$ input bits are divided, by a bit splitter of the UE, into $N_G$ groups, each of which p bits are input to an OFDM-IM modulator.

According to an embodiment, the OFDM-IM modulator may modulate the input bits to generate a G-dimensional subcarrier symbol vector. According to an embodiment, the p bits include $p_1$ bits conveying index information and $p_2$ bits conveying symbol information.

According to an embodiment, K subcarriers may be activated among the G subcarriers and, in this case, the $p_1$ bits may become $$\log_2\binom{G}{K},$$

and the $p_2$ bits may become $\log_2 M^K$ if the K subcarriers are each modulated via M-QAM.

According to an embodiment, if G=4 and K=2, it may be possible to map 2 bits to the index information depending on which subcarriers are activated in the subcarrier group. Table 1 shows example thereof.

TABLE 1

| Bits ($p_1$) | Activated subcarriers | Subcarrier block |
| --- | --- | --- |
| 0 0 | {1, 2} | [$s_1$, $s_2$, 0, 0] |
| 0 1 | {2, 3} | [0, $s_1$, $s_2$, 0] |
| 1 0 | {3, 4} | [0, 0, $s_1$, $s_2$] |
| 1 1 | {2, 4} | [0, $s_1$, 0, $s_2$] |

According to Table 1, it may be possible to determine 2 activated subcarriers among the 4 subcarriers using the 2 bits corresponding to the $p_1$ bits including the index information, and the determined subcarriers may be transmitted by determining $s_1$ and $s_2$ by a QAM modulator.

Figure 3:
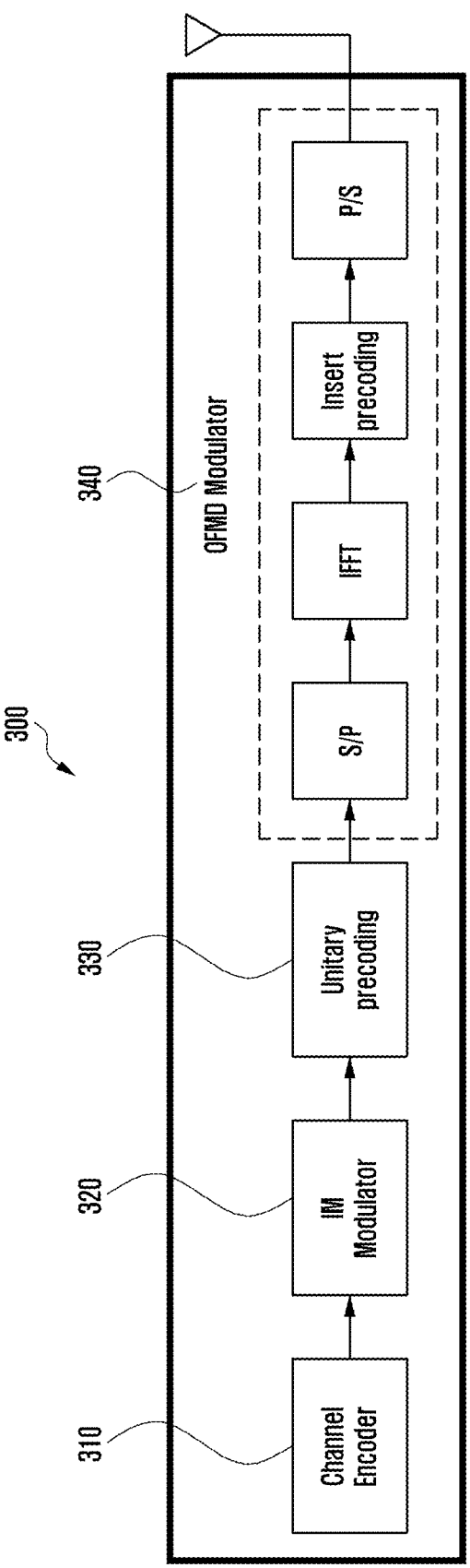
FIG. 3 illustrates a block diagram of a configuration of a UE according to an embodiment of the disclosure.

FIG. 3 illustrates a block diagram of a configuration of a UE according to an embodiment of the disclosure.

According to an embodiment, the UE 300 includes a channel encoder 310 that encodes transmit bits into encoded bits and an index modulator 320 that modulates the encoded bits to generate an N-dimensional symbol vector. According to an embodiment, the UE includes a unitary precoder 330 that performs precoding on the N-dimensional symbol vector and an OFDM modulator 340 that modulates the precoded N-dimensional symbol vector to obtain symbols, which are transmitted through subcarriers.

According to an embodiment, a NOMA system may be modeled by Equation 1.

$$\begin{bmatrix} y_1 \\ y_2 \\ \vdots \\ y_N \end{bmatrix} = \sum_{k=1}^{K} \begin{bmatrix} h_1^k & & & \\ & h_2^k & & \\ & & \ddots & \\ & & & h_N^k \end{bmatrix} \begin{bmatrix} x_1^k \\ x_2^k \\ \vdots \\ x_N^k \end{bmatrix} + \begin{bmatrix} n_1 \\ n_2 \\ \vdots \\ n_N \end{bmatrix} \quad \text{[Equation 1]}$$

In Equation 1, $y_n$ denotes a signal being received on an $n^{th}$ subcarrier, and $x_n^k$ denotes a signal transmitted by a $k^{th}$ UE on the $n^{th}$ subcarrier. A channel matrix may be expressed as a diagonal matrix having diagonal elements of $h_1^k$, $h_2^k$, ..., $h_N^k$ because of the use of the OFDM modulator 340. $h_n^k$ denotes a narrowband channel in the $n^{th}$ subcarrier of the $k^{th}$ UE. $n_i$ denotes a Gaussian noise signal with a mean of 0 and a standard deviation of 1.

Equation 1 may be expressed in the form of a matrix as shown in Equation 2.

$$\bar{y} = [H_1 \ H_2 \ \ldots \ H_K] \begin{bmatrix} x_{1,i_1} \\ x_{2,i_2} \\ \vdots \\ x_{K,i_K} \end{bmatrix} + \bar{n} \quad \text{[Equation 2]}$$

$$= \bar{H} \bar{x}_{i_1,\ldots,i_K} + \bar{n}$$

$\bar{y}$, $H_k$, $X_{k,i_k}$, $\bar{n}$ in Equation 2 may be expressed as Equation 3.

$\bar{y} = [y[1] y[2] \ldots y[N]]^T$ $H_k = \text{diag}[h_k[1] h_k[2] \ldots h_k[N]]^T$ $x_{k,i_k} = [x_{k,i_k}[1] x_{k,i_k}[2] \ldots x_{k,i_k}[N]]^T$ $\bar{n} = [n[1] n[2] \ldots n[N]]^T$ [Equation 3]

In Equation 3, $\bar{y}$ denotes a signal received at the base station, and $H_k$ denotes a matrix of channels for the subcarriers of the $k^{th}$ UE. $X_{k,i_k}$ denotes an $i_k^{th}$ codeword of the $k^{th}$ UE. In the case where each UE uses an M-ary codebook, the codeword may be $i_k \in \{1, 2, \ldots, M\}$.

According to an embodiment, it may be possible to analyze a mutual information amount and an error probability on uplink channels in the NOMA system model. Assuming that each UE uses an M-ary codebook, an approximation of the mutual information amount may be expressed as Equation 4.

$$\hat{I}(\bar{x}; \bar{y} | \bar{H}) = 2\log_2 M^K - \quad \text{[Equation 4]}$$

$$\log_2 \sum_{(i_1,\ldots,i_K)} \sum_{(j_1,\ldots,j_K)} \exp\left(-\frac{\|\bar{H}(\bar{x}_{i_1,\ldots,i_K} - \bar{x}_{j_1,\ldots,j_K})\|^2}{2\sigma^2}\right)$$

In Equation 4, $i_k$ and $j_k$ may each have a value in the range from 1 to M. Equation 4 may be rewritten as Equation 5 by substituting the exponential term for function f.

$$f(\bar{x}_{i_1,\ldots,i_K}, \bar{x}_j, \bar{H}) = \exp\left(-\frac{\|\bar{H}(\bar{x}_{i_1,\ldots,i_K} - \bar{x}_{j_1,\ldots,j_K})\|^2}{2\sigma^2}\right) \quad \text{[Equation 5]}$$

$$= \exp\left(-\frac{\sum_{k=1}^{K} \|h_k^H(x_{k,i_k} - x_{k,j_k})\|^2}{2\sigma^2}\right)$$

In Equation 5, $h_k^H$ may be expressed as $[h_k[1], h_k[2], \ldots, h_k[N]]$. Equation 5 may be rewritten as Equation 6 by performing eigen decomposition on $\|h_k^H(x_{k,i_k} - x_{k,j_k})^2\|$.

$$\|h_k^H(x_{k,i_k} - x_{k,j_k})\|^2 = h_k^H(x_{k,i_k} - x_{k,j_k})(x_{k,i_k} - x_{k,j_k})^H h_k$$

$$= h_k^H U \Lambda U^H h_k$$

$$= \lambda_1 \|\hat{h}_k[1]\|^2$$

$$= \|x_{k,i_k} - x_{k,j_k}\|^2 \|\hat{h}_k[1]\|^2$$

$$= \sum_{n=1}^{N} \|x_{k,i_k}[n] - x_{k,j_k}[n]\|^2 \|\hat{h}_k[1]\|^2$$

In Equation 6, $\lambda_1$ denotes an eigen value of $(x_{k,i_k} - x_{k,j_k})(x_{k,i_k} - x_{k,j_k})^H$, and $\hat{h}_k$ denotes $U^H h_k$. Equation 7 may be derived by substituting Equation 6 into Equation 4.

$$\hat{I}(\bar{x}; \bar{y} | \bar{H}) = 2\log_2 M^K - \log_2 \sum_{(i_1,\ldots,i_K)} \sum_{(j_1,\ldots,j_K)} \exp \quad \text{[Equation 7]}$$

$$\left(-\frac{\sum_{k=1}^{K}\sum_{n=1}^{N} \|x_{k,i_k}[n] - x_{k,j_k}[n]\|^2 \|\hat{h}_k[1]\|}{2\sigma^2}\right)$$

Because matrix U in Equation 6 is a unitary matrix, a probability distribution of channels is not changed. Accordingly, the first element $\hat{h}_k[1]$ of $\hat{h}_k$ may follow a Rayleigh distribution. Equation 8 may be derived by averaging values of Equation 7 for the channels following the Rayleigh distribution, and it may be possible to determine an approximate value of the mutual information amount on uplink channels based of Equation 8.

$$\hat{I}(\bar{x}; \bar{y}) = 2\log_2 M^K -$$ [Equation 8]

$$\log_2 \sum_{(i_1,\ldots,i_K)} \sum_{(j_1,\ldots,j_K)} \prod_{n=1}^{N} \prod_{k=1}^{K} \frac{1}{1 + \frac{\|x_{k,i_k}[n] - x_{k,j_k}[n]\|^2}{2\sigma^2}}$$

According to an embodiment, if an uplink channel matrix is given in the NOMA system model, a pair-wise error probability may be expressed as Equation 9.

$$P_{e|H} \leq \frac{1}{M^K} \sum_{[i_1,\ldots,i_K]} \sum_{\substack{[j_1,\ldots,j_K] \\ [j_1,\ldots,j_K] \neq [i_1,\ldots,i_K]}} P$$ [Equation 9]

$$[\bar{X}_{i_1,\ldots,i_K} \to \bar{X}_{j_1,\ldots,j_K} | \bar{H}]$$

The probability P in Equation 9 may be expressed as Equation 10.

$$P(\bar{x}_{i_1,\ldots,i_K} \to \bar{x}_{j_1,\ldots,j_K} | \bar{H}) =$$ [Equation 10]

$$Q\left(\sqrt{\frac{\|\bar{H}(\bar{x}_{i_1,\ldots,i_K} - \bar{x}_{j_1,\ldots,j_K})\|^2}{2\sigma^2}}\right)$$

Equation 11 may be derived by applying Chernoff bound to Equation 10.

[Equation 11]

$$P(\bar{x}_{i_1,\ldots,i_K} \to \bar{x}_{j_1,\ldots,j_K} | \bar{H}) \leq \exp\left(-\frac{\|\bar{H}(\bar{x}_{i_1,\ldots,i_K} - \bar{x}_{j_1,\ldots,j_K})\|^2}{4\sigma^2}\right)$$

$$= \exp\left(-\frac{\sum_{k=1}^{K} \|h_k^H(x_{k,i_k} - x_{k,j_k})\|^2}{4\sigma^2}\right)$$

Equation 12 may be derived by averaging channel random variables in Equation 11 as in Equation 8, and it is possible to analyze an error probability on uplink channels in the NOMA system model.

$$P_e \leq \frac{1}{M^K} \sum_{[i_1,\ldots,i_K]} \sum_{\substack{[j_1,\ldots,j_K] \\ [j_1,\ldots,j_K] \neq [i_1,\ldots,i_K]}} \prod_{n=1}^{N} \prod_{k=1}^{K}$$ [Equation 12]

$$\frac{1}{1 + \frac{\|x_{k,i_k}[n] - x_{k,j_k}[n]\|^2}{4\sigma^2}}$$

According to an embodiment, the approximation of the mutual information amount and the error probability derived in the uplink situation of the NOMA system module may determine a codebook of the NOMA system.

In order to determine the codebook, a signal-to-noise ratio (SNR) may be set to $1/\sigma^2$ in the NOMA system. In this case, as the SNR increases, Equation 13 may be derived from Equation 8 as an equation for the mutual information amount, and Equation 14 may be derived from Equation 12 as an equation for the error probability.

$$\hat{I}(\bar{x}; \bar{y}) \simeq 2\log_2 M^K - \log_2$$ [Equation 13]

$$\sum_{(i_1,\ldots,i_K)} \sum_{(j_1,\ldots,j_K)} \prod_{(n,k) \in I_{i,j}} \frac{2}{\|x_{k,i_k}[n] - x_{k,j_k}[n]\|^2} SNR^{-d}$$

$$P_e \leq$$ [Equation 14]

$$\frac{1}{M^K} \sum_{[i_1,\ldots,i_K]} \sum_{[j_1,\ldots,j_K]} \prod_{[n,k] \in I_{i,j}} \frac{4}{\|x_{k,i_k}[n] - x_{k,j_k}[n]\|^2} SNR^{-d}$$

In Equations 13 and 14, d may be expressed as equation 15, and $I_{ij}$ may be expressed as Equation 16.

$$d = \min_{\substack{[j_1,\ldots,j_K],[i_1,\ldots,i_K] \\ [j_1,\ldots,j_K] \neq [i_1,\ldots,i_K]}} \|\bar{x}_{i_1,\ldots,i_K} - \bar{x}_{j_1,\ldots,j_K}\|_\alpha$$ [Equation 15]

$$= \min_{k,i_k,j_k,i_k \neq j_k} \|x_{k,i_k} - x_{k,j_k}\|_0$$

$$I_{ij} = \{(n,k) \mid \|x_{k,i_k}[n] - x_{k,j_k}[n]\|^2 \neq 0\}$$ [Equation 16]

In Equation 15, d denotes a diversity order of the NOMA uplink system of the channels following the Rayleigh distribution. In Equation 15, d may be set to a minimum value of a 0 norm value of a difference between per-UE codewords.

In Equations 13 and 14, a shaping gain value may be expressed as Formula 17.

[Equation 17]

$$\sum_{(i_1,\ldots,i_K)} \sum_{(j_1,\ldots,j_K)} \prod_{(n,k) \in I_{i,j}} \frac{1}{\|x_{k,i_k}[n] - x_{k,j_k}[n]\|^2}$$

Accordingly, there is a need of a codebook that is capable of maximizing both of Equation 15 related to diversity order and Equation 17 related to shaping gain in view of the mutual information amount and error probability.

In order to help understand the above equations, descriptions are made with examples. Assuming that 6 UEs are simultaneously using 4 subcarriers, a 4-ary SCMA codebook may be expressed as Equation 18.

[Equation 18]

$$X_1^{SCMA} = \begin{bmatrix} 0.00 & 0.00 & 0.00 & 0.00 \\ -0.18 - 0.13i & -0.64 - 0.46i & 0.64 + 0.46i & 0.18 + 0.13i \\ 0.00 & 0.00 & 0.00 & 0.00 \\ 0.79 & -0.22 & 0.22 & -0.79 \end{bmatrix}$$

$$X_2^{SCMA} = \begin{bmatrix} 0.79 & -0.22 & 0.22 & -0.79 \\ 0.00 & 0.00 & 0.00 & 0.00 \\ -0.18 - 0.13i & -0.64 - 0.46i & 0.64 + 0.46i & 0.18 + 0.13i \\ 0.00 & 0.00 & 0.00 & 0.00 \end{bmatrix}$$

$$X_3^{SCMA} = \begin{bmatrix} -0.64 + 0.46i & 0.18 - 0.13i & -0.18 + 0.13i & 0.64 - 0.46i \\ 0.14 - 0.18i & 0.49 - 0.62i & -0.49 + 0.62i & -0.14 + 0.18i \\ 0.00 & 0.00 & 0.00 & 0.00 \\ 0.00 & 0.00 & 0.00 & 0.00 \end{bmatrix}$$

-continued $$X_4^{SCMA} = \begin{bmatrix} 0.00 & 0.00 & 0.00 & 0.00 \\ 0.00 & 0.00 & 0.00 & 0.00 \\ 0.79 & -0.22 & 0.22 & -0.79 \\ -0.01-0.22i & -0.02-0.78i & 0.02+0.78i & 0.01+0.22i \end{bmatrix}$$

$$X_5^{SCMA} = \begin{bmatrix} -0.01-0.22i & -0.02-0.78i & 0.02+0.78i & 0.01+0.22i \\ 0.00 & 0.00 & 0.00 & 0.00 \\ 0.00 & 0.00 & 0.00 & 0.00 \\ -0.64+0.46i & 0.18-0.13i & -0.18+0.13i & 0.64-0.46i \end{bmatrix}$$

$$X_6^{SCMA} = \begin{bmatrix} 0.00 & 0.00 & 0.00 & 0.00 \\ 0.79 & -0.22 & 0.22 & -0.79 \\ 0.14-0.18i & 0.49-0.62i & -0.49+0.62i & -0.14+0.18i \\ 0.00 & 0.00 & 0.00 & 0.00 \end{bmatrix}$$

In Equation 18, a difference between a first codeword of a first UE and another codeword may be expressed as Equation 19.

$$X_1^{SCMA} - X_1^{SCMA}(:,1) = \begin{bmatrix} 0.00 & 0.00 & 0.00 & 0.00 \\ 0.00 & -0.45-0.33i & 0.82+0.59i & 0.36+0.26i \\ 0.00 & 0.00 & 0.00 & 0.00 \\ 0.00 & -1.01 & -0.56 & -1.57 \end{bmatrix}$$ [Equation 19]

In Equation 19, a 0 norm value of each of rows with the exception of the first row, i.e., the second to fourth rows, may become 2. That is, according to Equation 19, the diversity order may become 2.

According to an embodiment, in the case of pattern division multiple access (PDMA), it may be possible to determine a 4-ray codebook using QPSK modulation, and a codebook as expressed by Equation 20 may be used.

$$X_1^{PDMA} = \begin{bmatrix} 1+j & 1-j & -1-j & -1+j \\ 1+j & 1-j & -1-j & -1+j \\ 0 & 0 & 0 & 0 \\ 0 & 0 & 0 & 0 \end{bmatrix}$$ [Equation 20]

$$X_2^{PDMA} = \begin{bmatrix} 1+j & 1-j & -1-j & -1+j \\ 0 & 0 & 0 & 0 \\ 1+j & 1-j & -1-j & -1+j \\ 0 & 0 & 0 & 0 \end{bmatrix}$$

$$X_3^{PDMA} = \begin{bmatrix} 1+j & 1-j & -1-j & -1+j \\ 0 & 0 & 0 & 0 \\ 0 & 0 & 0 & 0 \\ 1+j & 1-j & -1-j & -1+j \end{bmatrix}$$

$$X_4^{PDMA} = \begin{bmatrix} 0 & 0 & 0 & 0 \\ 1+j & 1-j & -1-j & -1+j \\ 1+j & 1-j & -1-j & -1+j \\ 0 & 0 & 0 & 0 \end{bmatrix}$$

$$X_5^{PDMA} = \begin{bmatrix} 0 & 0 & 0 & 0 \\ 1+j & 1-j & -1-j & -1+j \\ 0 & 0 & 0 & 0 \\ 1+j & 1-j & -1-j & -1+j \end{bmatrix}$$

$$X_6^{PDMA} = \begin{bmatrix} 0 & 0 & 0 & 0 \\ 0 & 0 & 0 & 0 \\ 1+j & 1-j & -1-j & -1+j \\ 1+j & 1-j & -1-j & -1+j \end{bmatrix}$$

Equation 21 is derived by calculating Equation 20 in the same manner as Equation 19, and a codebook diversity order value of PDMA corresponding to Equation 20 may become 2.

$$X_1^{PDMA} - X_1^{PDMA}(:,1) = \begin{bmatrix} 0 & -2j & -2-2j & -2 \\ 0 & -2j & -2-2j & -2 \\ 0 & 0 & 0 & 0 \\ 0 & 0 & 0 & 0 \end{bmatrix}$$ [Equation 21]

Figure 4:
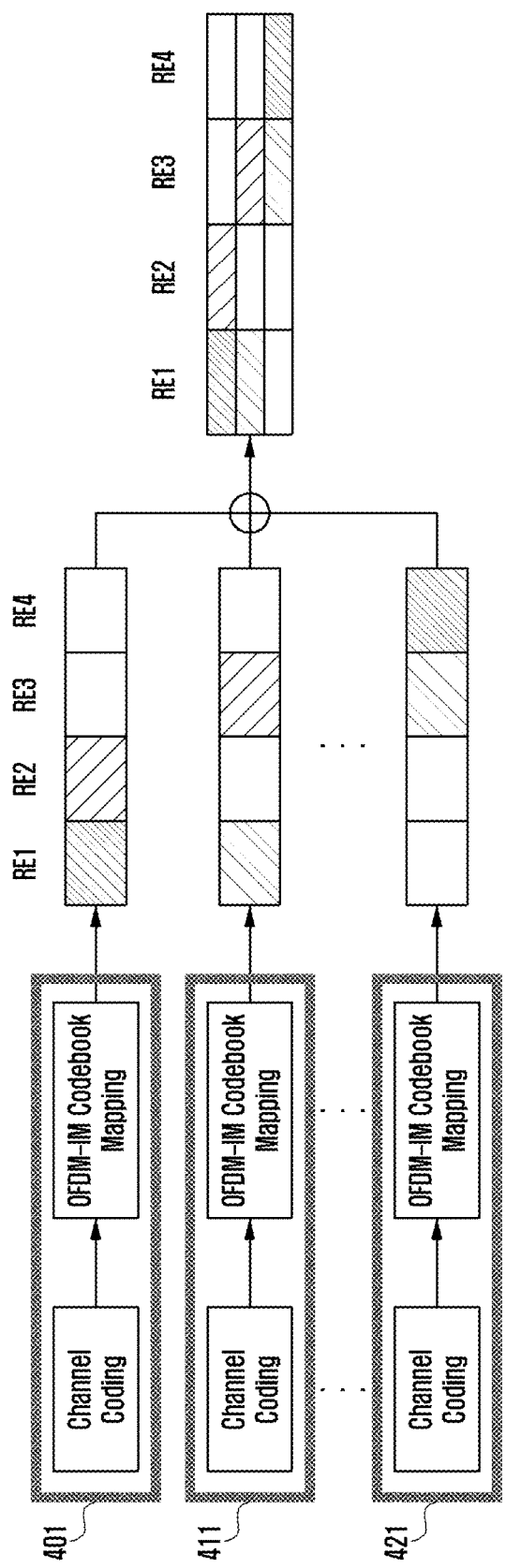
FIG. 4 illustrates a diagram of an OFDM-IM-based NOMA system according to an embodiment of the disclosure.

FIG. 4 illustrates a diagram of an OFDM-IM-based NOMA system according to an embodiment of the disclosure.

According to an embodiment, K UEs 401, 411, ..., 421 perform OFDM-IM modulation to convert coded bits to N-dimensional symbol vectors, which are transmitted on at least one subcarrier. According to an embodiment, all of the UEs may share the at least one subcarrier by nature of the NOMA system. That is, the base station may receive a signal in which the symbols transmitted by the respective UEs are superpositioned.

For example, if K UEs share 4 subcarriers including 2 activated subcarriers and use on-off keying modulation, the NOMA system may use a codebook of Equation 22.

$$X_i^{IM} = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}$$ [Equation 22]

As shown in Equation 23, because the number of 0 norms is 2 in each of all rows with the exception of the first row obtained by subtracting the Equation 22 from the Equation 22, it may be possible to achieve a diversity order of 2 by using the codebook of Equation 22 in the NOMA system.

$$X_i^{IM} - X_i^{IM}(:,1) = \begin{bmatrix} 0 & 0 & 0 & -1 & -1 & -1 \\ 0 & -1 & -1 & 0 & 0 & -1 \\ 0 & 1 & 0 & 1 & 0 & 1 \\ 0 & 0 & 1 & 0 & 1 & 1 \end{bmatrix}$$ [Equation 23]

According to an alternative embodiment, if K UEs share 4 subcarriers including 2 activated subcarriers and use BPSK modulation, the NOMA system may use a codebook of Equation 24.

$$X_i^{IM} = \begin{bmatrix} 1 & -1 & 1 & -1 & \ldots & 0 & 0 & 0 & 0 \\ 1 & 1 & -1 & -1 & \ldots & 0 & 0 & 0 & 0 \\ 0 & 0 & 0 & 0 & \ldots & 1 & -1 & 1 & -1 \\ 0 & 0 & 0 & 0 & \ldots & 1 & 1 & -1 & -1 \end{bmatrix}$$ [Equation 24]

Using the same principle as the derivation of Equation 23, it may be possible to derive Equation 25 from Equation 24; because the number of 0 norms is 1 in the second and third rows in Equation 25, it may be possible to achieve a diversity order of 1 by using the codebook of Equation 24 in the NOMA system.

$$X_i^{IM} - X_i^{IM}(:,1) = \quad \text{[Equation 25]}$$

$$\begin{bmatrix} 0 & -2 & 0 & -2 & \ldots & -1 & -1 & -1 & -1 \\ 0 & 0 & -2 & -2 & \ldots & -1 & -1 & -1 & -1 \\ 0 & 0 & 0 & 0 & \ldots & 1 & -1 & 1 & -1 \\ 0 & 0 & 0 & 0 & \ldots & 1 & 1 & -1 & -1 \end{bmatrix}$$

According to an embodiment, it may be possible to consider employing a unit precoding technique in order to achieve an additional diversity gain. According to an embodiment, Equation 27 may be derived by multiplying Equation 25 by an arbitrary precoding matrix such as Equation 26.

$$U = \begin{bmatrix} -0.51 & -0.02 & -0.34 & 0.79 \\ -0.25 & 0.68 & 0.57 & -0.38 \\ 0.15 & -0.66 & 0.71 & -0.22 \\ -0.81 & -0.32 & -0.25 & -0.42 \end{bmatrix} \quad \text{[Equation 26]}$$

$$U(X_i^{IM} - X_i^{IM}(:,1)) = \quad \text{[Equation 27]}$$

$$\begin{bmatrix} 0 & 1.02 & 0.04 & 1.06 & \ldots & 0.98 \\ 0 & 0.49 & -1.36 & -0.86 & \ldots & -1.38 \\ 0 & -0.30 & 1.31 & 1.00 & \ldots & -0.42 \\ 0 & 1.61 & 0.64 & 2.25 & \ldots & -0.96 \end{bmatrix}$$

In Equation 27, because the number of zero norms is 4 in each of all rows with the exception of the first row in Equation 27, the diversity order of Equation 27 may become 4. That is, it is may be possible to observe that using the OFDM-IM codebook unit-precoded through Equation 27 increases the diversity order as compared with not using the unit-precoding technique.

According to an embodiment, the arbitrary unitary matrix for use of the unit precoding technique may be expressed as Equation 28.

$$U = \prod_{\substack{i \leq L-1, \\ i+1 \leq j \leq L}} G(i, j, \theta_{i,j}, \alpha_{i,j}) \hat{I}_{N \times N} \quad \text{[Equation 28]}$$

The arbitrary unitary matrix of Equation 28 may be decomposed so as to be expressed as a product of a complex given matrix G and $\hat{I}_{N \times N}$ defined in Equation 29.

$$G[i, j, \theta_{i,j}, \alpha_{i,j}] = \quad \text{[Equation 29]}$$

$$\begin{bmatrix} 1 & & & & & \\ & \ddots & & & & \\ & & \cos\theta_{i,j} & \ldots & -\sin\theta_{i,j} e^{i\alpha_{i,j}} & \\ & & \vdots & & \vdots & \\ & & \sin\theta_{i,j} e^{i\alpha_{i,j}} & \ldots & \cos\theta_{i,j} & \\ & & & & & \ddots \\ & & & & & & 1 \end{bmatrix}$$

$$\hat{I}_{N \times N} = \begin{bmatrix} \pm 1 & & & \\ & \pm 1 & & \\ & & \ddots & \\ & & & \pm 1 \end{bmatrix}$$

Because the arbitrary unitary matrix of Equation 28 is a product of $$\binom{N}{2} = \frac{N(N-1)}{2}$$

G matrices, Equation 28 may be rewritten as an optimization problem for obtaining N(N−1) optimal parameters as expressed by Equation 30.

$$[\bar{\theta}, \bar{\alpha}] = \underset{\bar{\theta}, \bar{\alpha}}{\operatorname{argmin}} \sum_{i,j} \prod_{(n,k) \in I_{ij}} \frac{1}{\|\tilde{x}_{i,k}[n] - \tilde{x}_{j,k}[n]\|^2}, \quad \text{[Equation 30]}$$

where $\tilde{x}_i[k] = U x_i[k]$ $\bar{\theta} = [\theta_{1,2}, \theta_{1,3}, \ldots, \theta_{N,N-1}]$ $\bar{\alpha} = [\alpha_{1,2}, \alpha_{1,3}, \ldots, \alpha_{N,N-1}]$ For example, if N=2 and a codebook of $$X_1^{IM} = \begin{bmatrix} +1 & -1 & 0 & 0 \\ 0 & 0 & +1 & -1 \end{bmatrix}$$

is used, the unitary matrix for achieving a maximum shaping gain may be expressed as Equation 31, and, in this case, the unit-precoded codebook may be expressed as Equation 32.

$$U^* = \begin{bmatrix} 0.717 & 0.717i \\ 0.717i & 0.717 \end{bmatrix} \quad \text{[Equation 31]}$$

$$U^* X_1^{IM} = \begin{bmatrix} 0.717 & -0.717 & 0.717i & -0.717i \\ 0.717i & -0.717i & 0.717 & -0.717 \end{bmatrix} \quad \text{[Equation 32]}$$

That is, an OFDM-IM-capable UE may determine a codebook that is capable of maximizing the diversity order and shaping gain in the NOMA system by using a unitary matrix derived through the above procedure.

Figure 5:
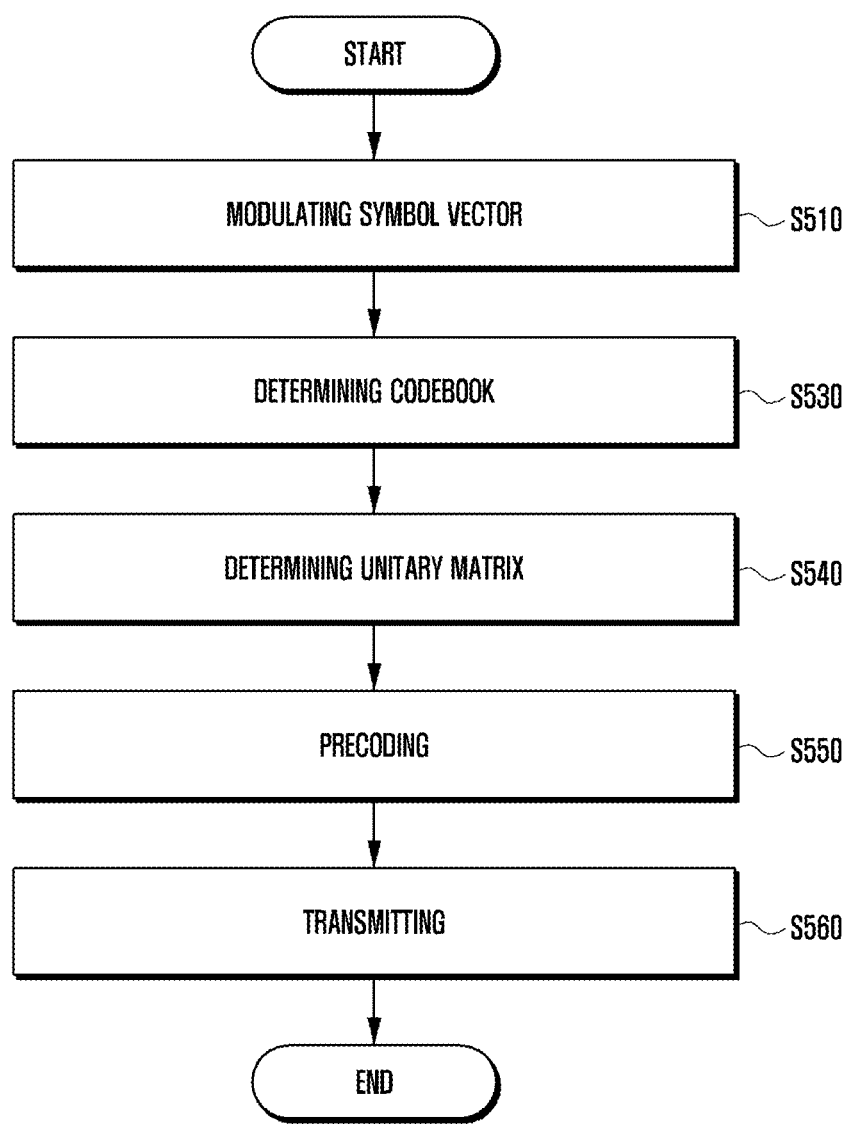
FIG. 5 illustrates a flowchart of a codebook determination method according to an embodiment of the disclosure.

FIG. 5 illustrates a flowchart of a codebook determination method according to an embodiment of the disclosure.

According to an embodiment of the disclosure, a UE may modulate input bits, at step S510, to generate a symbol vector using index information. According to an embodiment, the input bits may include first bits conveying index information and second bits conveying symbol information. Descriptions are made of the configuration of bits and the procedure for modulating the bits to generate a symbol vector later with reference to FIG. 6.

According to an embodiment, once the coded bits are modulated to generate a symbol vector by an IM modulator, the UE may determine a codebook, at step S530, for use in the NOMA system based on subcarrier information and modulation information.

According to an embodiment, the codebook may be determined based on a number of subcarriers available for use by the UE, a number of activated subcarriers among the subcarriers available for use by the UE, a number of UEs capable of sharing the subcarriers available for use by the UE in the wireless communication system, or a modulation scheme of the UE. The detailed description of the method for determining a codebook has been made above in detail with reference to the Equations and thus is omitted herein.

According to an embodiment, after determining the codebook at step S530, the UE may determine a unitary matrix at step S540 for enhancing the codebook to enhance the diversity order and shaping gain of the codebook. The detailed description of the procedure for deriving the unitary matrix has been described above in detail with reference to the Equations and thus is omitted herein. According to an embodiment, the unitary matrix may vary according to the UE using the NOMA system.

According to an embodiment, after determining the unitary matrix at step S540, the UE may perform precoding on the symbol vector at step S550 based on the codebook and the unitary matrix. According to an embodiment, the UE may determine a codebook showing improvement in diversity order and shaping gain in the NOMA system using Equation 32 and perform precoding based on the enhanced codebook.

According to an embodiment, the UE may transmit the precoded symbol vector to the base station on a subcarrier at step S560.

Figure 6:
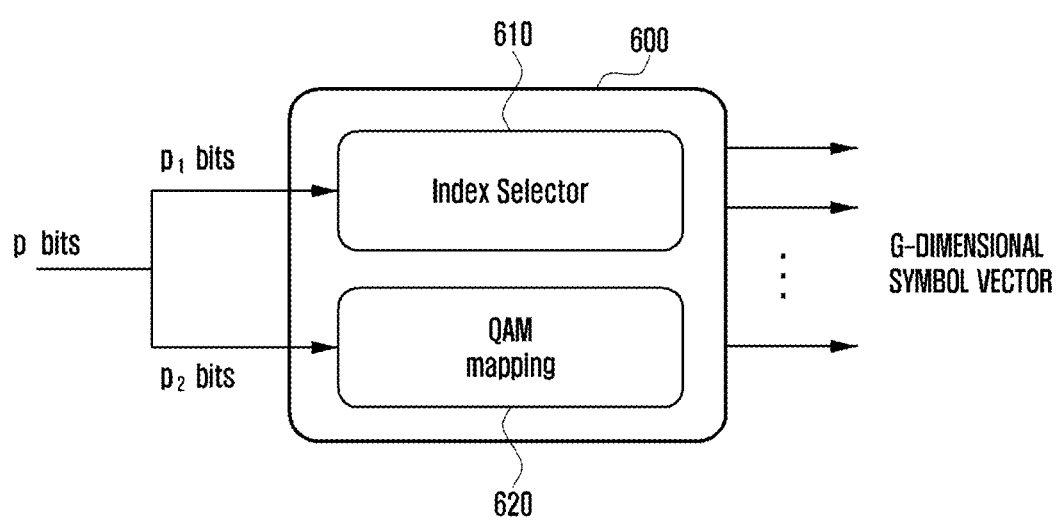
FIG. 6 illustrates a diagram of a procedure for modulating coded bits to generate a symbol vector according to an embodiment of the disclosure.

FIG. 6 illustrates a diagram of a procedure for modulating coded bits to generate a symbol vector according to an embodiment of the disclosure.

According to an embodiment, the coded bits are input to an index modulator 600. The coded bits p may include first bits $p_1$ conveying index information and second bits $p_2$ conveying symbol information. According to an embodiment, the first bits $p_1$ are input to an index selector 610. The index selector 610 may convert the first bits $p_1$ to a symbol vector based on Table 1. According to an embodiment, the subcarriers selected (or activated) by the index selector 610 can be transmitted by determining symbol vectors s1 and s2 by the QAM modulator 620.

Figure 7:
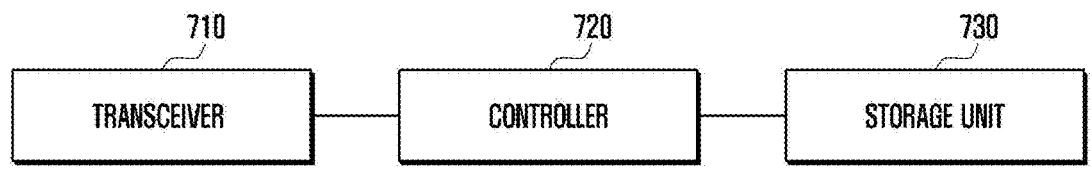
FIG. 7 illustrates a block diagram of a configuration of a UE according to an embodiment of the disclosure.

FIG. 7 illustrates a block diagram of a configuration of a UE according to an embodiment of the disclosure.

In reference to FIG. 7, the UE may include a transceiver 710, a controller 720, and a storage unit 730. In the disclosure, the controller may be defined as a circuit, an application-specific integrated circuit, or at least one processor.

The transceiver may transmit and receive signals to and from another network entity. For example, the transceiver 710 may receive system information, a synchronization signal, or a reference signal from a base station.

According to an embodiment of the disclosure, the controller 720 may control overall operations of the UE.

The storage unit 730 may store at least one of information being transmitted/received by the transceiver 710 and information being generated by the controller 720.

The embodiments disclosed in the specification and drawings are proposed to help explain and understand the present invention rather than to limit the scope of the present invention. It is obvious to those skilled in the art that various modifications and changes can be made thereto without departing from the broader spirit and scope of the invention. If necessary, the embodiments may be combined in whole or in part. For example, embodiments of the disclosure may be combined in part with each other to form an embodiment for the operations of a base station and a terminal.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
determining activated subcarriers among subcarriers available for use by the terminal based on first bits;
modulating second bits as a symbol vector based on the activated subcarriers that are determined based on the first bits associated with an index;
determining a codebook based on information on subcarriers and information on modulation;
determining a unitary matrix to be assigned to the terminal based on a codeword of the determined codebook, wherein the unitary matrix is determined to maximize a diversity order and shaping gain of the codebook;
precoding the symbol vector based on the codebook and the unitary matrix; and
transmitting the symbol vector to a base station on the subcarriers,
wherein the second bits are associated with symbols.

2. The method of claim 1, wherein determining the codebook comprises determining the codebook based on a number of activated subcarriers, a number of terminals sharing the subcarriers, and a modulation scheme.

3. The method of claim 1, wherein the first bits are determined based on a number of activated subcarriers.

4. The method of claim 1, further comprising performing orthogonal frequency division multiplexing (OFDM) modulation on the precoded symbol vector after precoding.

5. The method of claim 1, wherein the wireless communication system is a non-orthogonal multiple access (NOMA) wireless system.

6. A terminal in a wireless communication system, the terminal comprising:
a transceiver; and
a controller configured to:
determine activated subcarriers among subcarriers available for use by the terminal based on first bits,
modulate second bits as a symbol vector based on the activated subcarriers that are determined based on the first bits associated with an index,
determine a codebook based on information on subcarriers and information on modulation,
determine a unitary matrix to be assigned to the terminal based on a codeword of the determined codebook, wherein the unitary matrix is determined to maximize a diversity order and shaping gain of the codebook,
precode the symbol vector based on the codebook and the unitary matrix, and
transmit the symbol vector to a base station on the subcarriers,
wherein the second bits are associated with on symbols.

7. The terminal of claim 6, wherein the controller is configured to control to determine the codebook based on a number of activated subcarriers, a number of terminals sharing the subcarriers, and a modulation scheme.

8. The terminal of claim 6, wherein the first bits are determined based on a number of activated subcarriers.

9. The terminal of claim 6, wherein the controller is configured to control to perform orthogonal frequency division multiplexing (OFDM) modulation on the precoded symbol vector after precoding.

10. The terminal of claim 6, wherein the wireless communication system is a non-orthogonal multiple access (NOMA) wireless system.

11. A terminal in a wireless communication system, the terminal comprising:
a channel encoder configured to encode input bits, wherein the input bits comprise first bits are associated with an index and second bits are associated with symbols;

an index modulator configured to receive the encoded input bits from the channel encoder, determine activated subcarriers among subcarriers available for use by the terminal based on the first bits, and modulate the second bits as a symbol vector based on the activated subcarriers that are determined based on the first bits associated with the index;

a processor configured to:
control to determine a codebook based on information on subcarriers and information on modulation, determine a unitary matrix to be assigned to the terminal based on a codeword of the determined codebook, wherein the unitary matrix is determined to maximize a diversity order and shaping gain of the codebook, and precode the symbol vector based on the codebook and the unitary matrix; and an orthogonal frequency division multiplexing (OFDM) modulator configured to perform OFDM modulation on the precoded symbol vector to transmit the precoded symbol vector on subcarriers.

12. The terminal of claim 11, wherein the processor is configured to control to:
determine a codebook based on (i) a number of activated subcarriers, (ii) a number of terminals sharing the subcarriers, and (iii) a modulation scheme.

13. The terminal of claim 11, wherein the wireless communication system is a non-orthogonal multiple access (NOMA) wireless system.

* * * * *